United States Patent
Arduino et al.

(10) Patent No.: US 6,365,872 B1
(45) Date of Patent: Apr. 2, 2002

(54) METHOD FOR CUTTING A WINDOW IN A VERTICAL SHEET OF MATERIAL, ESPECIALLY SHEET METAL

(75) Inventors: Alberto Arduino, Turin; Luciano Sponza, Cafasse; Paolo Gian Prunotto, Turin, all of (IT)

(73) Assignees: Amada Company, Limited, Kanagawa (JP); Crea S. R. L., Turin (IT)

( * ) Notice: Subject to any disclaimer, the term of this patent is extended or adjusted under 35 U.S.C. 154(b) by 0 days.

(21) Appl. No.: 09/381,738

(22) PCT Filed: Apr. 23, 1998

(86) PCT No.: PCT/JP98/01879

§ 371 Date: Jan. 11, 2000

§ 102(e) Date: Jan. 11, 2000

(87) PCT Pub. No.: WO98/47656

PCT Pub. Date: Oct. 29, 1998

(30) Foreign Application Priority Data

Apr. 24, 1997 (IT) .......................... TO97A0356

(51) Int. Cl.[7] .............................................. B23K 26/00
(52) U.S. Cl. ........................... 219/121.72; 219/121.67; 219/121.85; 219/121.69; 219/121.6

(58) Field of Search ....................... 219/121.72, 121.67, 219/121.85, 121.69, 121.6

(56) References Cited

U.S. PATENT DOCUMENTS

| | | | | |
|---|---|---|---|---|
| 4,940,879 A | * | 7/1990 | De-Swaan | 219/121.67 |
| 5,182,428 A | * | 1/1993 | Jack et al. | 219/121.63 |
| 5,444,210 A | * | 8/1995 | Bingener et al. | 219/121.67 |

FOREIGN PATENT DOCUMENTS

| DE | EP 0 454 620 A | 10/1991 |
|---|---|---|
| IT | T0950569 A | 1/1997 |

* cited by examiner

*Primary Examiner*—M. Alexandra Elve
(74) *Attorney, Agent, or Firm*—Blank Rome Comisky & McCauley LLP

(57) ABSTRACT

A method for cutting a window in a sheet of material that is held in a vertical plane. The cut is obtained by moving a cutting head that emits a fluid along a closed cutting run (14) that defines the outline of a piece of waste material (18). The run (14) returns to its starting point situated above a horizontal axis (22) passing through the barycenter (20) of the piece of waste material (18) and preferably situated in the vicinity of a vertical (24) passing through the barycenter.

4 Claims, 2 Drawing Sheets

METHOD FOR CUTTING A WINDOW IN A VERTICAL SHEET OF MATERIAL, ESPECIALLY SHEET METAL

TECHNICAL FIELD

The present invention relates to a method for cutting a window in a vertical sheet of material, especially sheet metal.

More precisely, the invention relates to the operation of cutting—by means of a laser, for example—sheets held in a vertical plane.

BACKGROUND ART

A plant for cutting and bending pieces of sheet metal in which the sheets are cut in a vertical plane is described in the Italian patent application No. T095A000569 in the name of the present applicant. As compared with cutting operations in which the metal sheet is held in a horizontal plane, cutting in a vertical plane is associated with the advantage that the plant comes to occupy a smaller floor space and that the equipment needed to support the work piece is simplified. Nevertheless, cutting sheets of sheet metal while held in a vertical plane brings with it a series of problems that are not encountered in the more traditional case in which the sheet to be cut rests on a horizontal table.

One of these problems occurs in the case in which windows have to be cut in metal sheets held in a vertical plane. Hereinafter, in both the description and the claims, the term "window" is intended to refer to any aperture passing through the sheet, no matter what its shape. Cutting a window inevitably entails the production of a piece of waste material. When the metal sheets are held in a vertical plane, these pieces of waste material can interfere with the cutting process. In fact, these pieces of waste material could fall towards the laser cutting head and thus become entangled with it or cause damage; alternately, they could remain on the sheet to be cut and protrude in the direction of the cutting head, which is particularly liable to happen in the case of sheet metal of considerable thickness, once again becoming entangled with the laser head or causing damage to It. These risks become considerably greater when the pieces of waste material have a generally concave form or parts that either protrude or are recessed, because this will considerably increase the possibility of the piece of waste material becoming entangled with the work piece at the end of the cut of the window.

DISCLOSURE OF INVENTION

The present invention has been achieved with such a point in mind. Therefore, the object of the present Invention is to provide a method for cutting a window in a vertical sheet of material, especially sheet metal which overcome s the said problems and drawbacks.

According to the present invention, the object as aforesaid is attained by a method having the characteristics set out in the claims attached hereto.

The innovative concept on which the present invention is based consists essentially of defining a cutting run that returns to its starting point, the said starting point being situated above a horizontal axis passing through the barycentre of the piece of waste material.

Thanks to this solution idea, the pieces of waste material will fall on the side of the metal sheet opposite to the side on which the laser cutting head is being operated, this by virtue of the well known fact that the laser beam is accompanied by a gas jet at a relatively high pressure.

The point at which the cutting run commences and closes is preferably situated above a horizontal axis through the barycentre an d in the vicinity of a vertical axis through that centre, because this will facilitate the piece of waste falling without performing a turning motion.

In the case in which the window to be cut is either of a concave shape or has parts that either protrude or are recessed, the cutting of the window is subdivided in such a way as to cut several pieces of waste material that are devoid of both protrusions and recesses. Each of the pieces of waste material is cut as previously described, that is to say, with a cutting run that closes at its starting point, this point being situated above a horizontal axis through the barycentre and, preferably, also in the vicinity of the vertical axis through the barycentre of the piece of waste material.

BRIEF DESCRIPTION OF DRAWINGS

Further characteristics and advantages of the present invention will become apparent in the course of the detailed description given below, which is provided purely by way of non limitative example, with reference to the following drawings attached hereto, wherein.

BEST MODE FOR CARRYING OUT THE INVENTION

Figure 1:
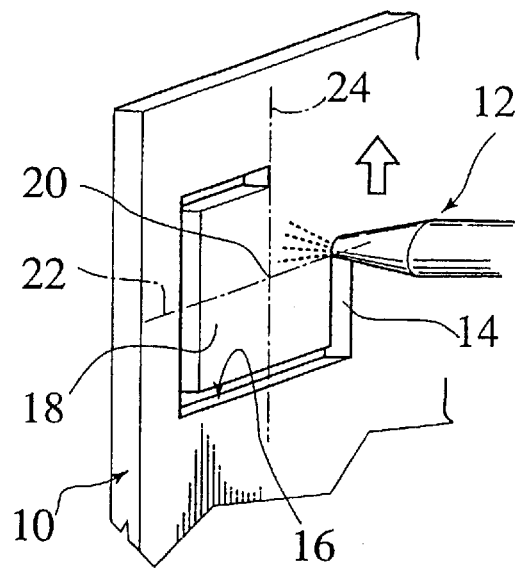
FIGS. 1, 2 and 3, show schematically the cutting sequence employed when a window is cut in accordance with the method of the present invention.

There will be detailed below the preferred embodiments of the present invention with reference to the accompanying drawings. Like members are designated by like reference characters.

Figures 2, 3:
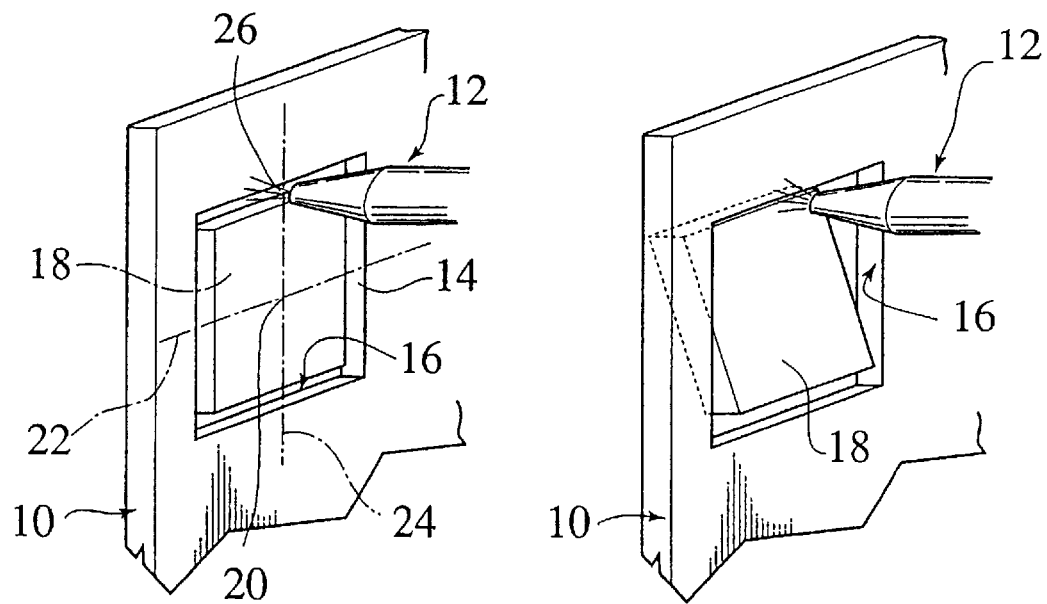

FIGS. 1 to 3 schematically illustrate the cutting sequence for cutting a window of, say, quadrangular form in a metal sheet 10 that is being held in a vertical plane. The cutting operation is carried out by moving a schematically indicated cutting head 12 capable of emitting a fluid while in use, which could—be for example—a laser focusing head or a plasma or water jet cutting head, along a cutting run 14 that defines the outline of the window 16. The cutting run 14 likewise defines the perimeter of a piece of waste material 18 whose barycentre is indicated by the reference number 20. Also show in the figures are two axes passing through the barycentre of the piece of waste material 18, one of these axes being horizontal 22 and the other vertical 24.

According to the present invention, the cutting run 14 that defines the outline of the piece of waste material 18 returns to its starting point 26 situated above the horizontal axis through the barycentre 22 and preferably situated either on or in the vicinity of the vertical axis through the barycentre 24.

During the cutting operation, which in the present form of implementation will be assumed to be performed with a laser, the laser beam is accompanied by a gas jet consisting of oxygen, nitrogen and a mixture of other gases at a pressure that will generally range between about 1 and 10 bar, but in certain cases may also reach 20 bar. When the cut is terminated in a zone situated above the axis 22 and preferably in the vicinity of the axis 24, there is a very good probability that the piece of waste material 18, thanks to the action of the said gas flow, will rotate around a horizontal axis parallel to the axis 22 through the barycentre and eventually drop on the side away from the cutting head. In this way one avoids the pieces of waste material falling against the cutting head and the consequent risk of their becoming entangled with the cutting equipment or causing damage to it.

Figure 4:
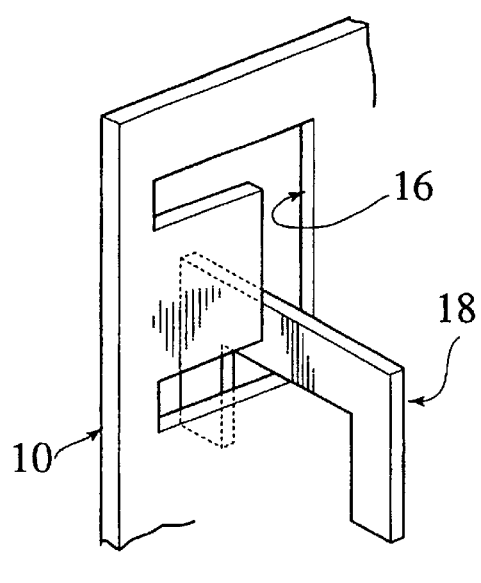
FIGS. 4 and 5, illustrate situations of entanglement of pieces of waste material that result from the cutting of windows of a generally concave shape.
Figure 5:
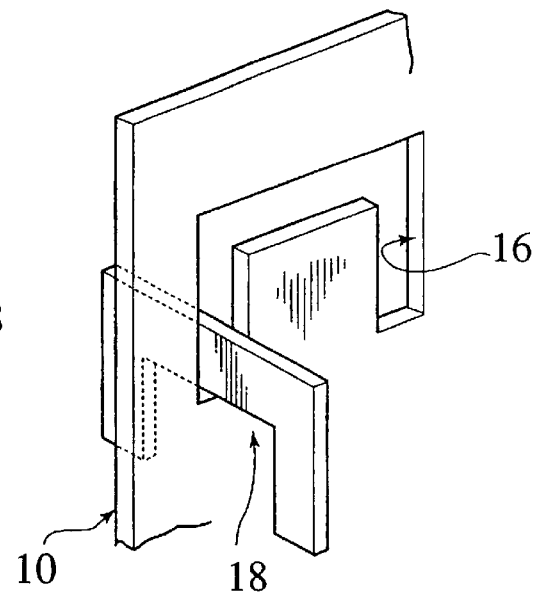

FIGS. 4 and 5 illustrate the problem that may be encountered when cutting a window having the generic shape of a "C". In this case, even when one adopts the method described hereinabove, the piece of waste material 18 still has some probability of becoming entangled with the sheet of material from which it has been cut, thereby creating an obstacle as far as movements of the laser focusing head 12 are concerned. In general, a problem of this type will occur in all cases in which the window is of a generally concave shape or comprises either protruding or recessed parts, as is the case of shapes in the manner of a "C", an "L", a "T", a "V", etc.

Figure 6:
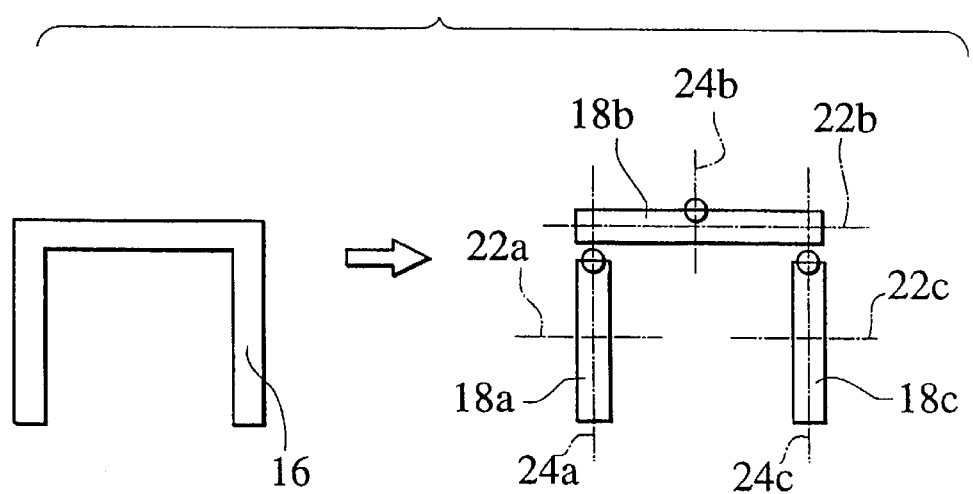
FIG. 6, shows schematically the cutting sequence adapted to solve these entanglement problems.

As schematically shown in FIG. 6, in these cases the window 16 is subdivided in such a way that the cutting operation gives rise to several pieces of waste material, indicated in the figure by the reference numbers 18a, 18b and 18c. The number and the shape of the pieces of waste material 18 will depend on the shape of the window it is desired to cut. In all cases, however, the shape of the individual pieces of waste material 18a, 18b, 18c is such as to be wholly devoid of protrusions and recesses. The individual pieces of waste material are cut in succession and independently of each other, using the previously described cutting method illustrated by FIGS. 1 to 3. More precisely, each of the pieces of waste material 18a, 18b, 18c that make up the window 16 is cut by following a cutting run that returns to its starting point situated above the horizontal axis 22a, 22b, 22c passing through the barycentre of the pieces of waste material 18a, 18b, 18c. Preferably, moreover, the starting and closure points of the cutting runs will also be situated in the vicinity of the respective vertical axes 24a, 24b, 24c of the said pieces 18a, 18b, 18c.

While preferred embodiments of the present invention have been described using specific terms, such description is for illustrative purposes, and it is to be understood that changes and variations may be made without departing from the spirit or scope of the following claims.

INDUSTRIAL APPLICABILITY

As stated hereinbefore, the method for cutting a window in a sheet of material, especially sheet metal according to the invention is applicable for use in cutting machines, especially for a laser cutting machine which comprises: a clamping device for supporting the sheet metal to be cut in a horizontal or vertical plane; and a laser cutting head movable relative to the sheet metal in the horizontal or vertical plane. Furthermore, the invention is applicable for use in cutting machines which comprise a laser focusing head or a plasma or water jet cutting head instead of the laser cutting head of the laser cutting machine.

What is claimed is:

1. A method for cutting a window in a sheet of material, especially sheet metal, comprising the steps of:

(a) holding the sheet in a vertical plane;

(b) cutting the sheet by using a cutting head capable of emitting a fluid while in use and moving the said cutting head along a closed run that defines the outline of a piece of waste material contained within said window such that said run returns to its starting point situated above a horizontal axis passing through the barycentre of said piece of waste material; and (c) by action of the fluid emitted from the cutting head, dropping the piece of waste material from the window in the sheet of material held in the vertical plane such that the waste material falls on a side of the sheet opposite to a side on which the cutting head is located during step (b).

2. A method in accordance with claim 1, wherein said run returns to its starting point situated in the vicinity of a vertical axis passing through the barycentre of the piece of waste material.

3. A method in accordance with claim 1, wherein said method is used for cutting a window of a generally concave shape or comprising parts that are either protruding or recessed in a sheet of material, especially sheet metal, characterized in that the cutting of the window is subdivided into cutting several pieces of waste material each of which is devoid of protrusions or recesses and, further, that each of said pieces of waste material is cut by using steps (b) and (c).

4. A method in accordance with claim 2, wherein said method is used for cutting a window of a generally concave shape or comprising parts that are either protruding or recessed in a sheet of material, especially sheet metal, characterized in that the cutting of the window is subdivided into cutting several pieces of waste material each of which is devoid of protrusions or recesses and, further, that each of said pieces of waste material is cut by using steps (b) and (c).

* * * * *